United States Patent [19]
White

[11] 3,821,153
[45] June 28, 1974

[54] POLYACETYLENE TERPOLYMERS AND PLASTICIZED POLYACETYLENE BLENDS

[75] Inventor: Dwain M. White, Schenectady, N.Y.

[73] Assignee: General Electric Company, Schenectady, N.Y.

[22] Filed: Jan. 29, 1973

[21] Appl. No.: 327,427

Related U.S. Application Data

[62] Division of Ser. No. 118,467, Feb. 24, 1971, abandoned.

[52] U.S. Cl. ..... 260/33.6 UA, 23/209.1, 260/47 UA
[51] Int. Cl. .... C08f 45/28, C08f 19/20, C01b 31/07
[58] Field of Search .. 260/33.6 UA, 47 UA, 88.2 D, 260/668; 23/209.1 F

[56] References Cited
UNITED STATES PATENTS

| | | | |
|---|---|---|---|
| 3,300,456 | 1/1967 | Hay | 260/88.2 |
| 3,332,916 | 7/1967 | Hay | 260/80 L |
| 3,519,611 | 7/1970 | Hay | 260/94.1 |
| 3,534,251 | 10/1970 | Brenschede | 260/31.8 AN |

FOREIGN PATENTS OR APPLICATIONS 1,149,697   4/1969   Great Britain

*Primary Examiner*—Allan Lieberman
*Assistant Examiner*—S. L. Fox
*Attorney, Agent, or Firm*—William A. Teoli; Joseph T. Cohen; Jerome C. Squillaro

[57] ABSTRACT

Certain polyacetylene terpolymers are provided having chemically combined ether linkages, or alkylene linkages and mixtures thereof, exhibiting improved compatability with various organic plasticizers. Blends of polyacetylene, including the polyacetylene terpolymers, and certain substantially non-volatile aliphatically unsaturated plasticizers, such as 1,4-diphenylbutadiyne, have been found to be melt extrudable, and convertible to carbonaceous films and molded carbon objects.

7 Claims, No Drawings

POLYACETYLENE TERPOLYMERS AND PLASTICIZED POLYACETYLENE BLENDS

This is a division of application Ser. No. 118,467, filed Feb. 24, 1971 now abandoned.

The present invention relates to certain polyacetylene terpolymers and plasticized polyacetylene blends useful for making carbonaceous films and fibers.

Prior to the present invention, various attempts were made to carbonize numerous organic polymers in fibrous form having a high carbon content to provide for high strength graphite fibers. As shown in Johnson et al. U.S. Pat. No. 3,412,062, for example, carbon fibers having a high tensile strength and Young's modulus can be made from polyacrylonitrile. Although desirable results can be achieved with polyacrylonitrile fibers, these fibers must be subjected to a preliminary oxidation treatment to stabilize the fibers prior to graphitization. Although the preoxidation treatment results in fiber stability, it also can result in considerable fiber weight loss and reduction in carbon values. It is generally known that polyacetylenes, for example, polymers shown by Hay U.S. Pat. Nos. 3,300,456; 3,332,916; 3,519,611, British Pat. No. 1,149,697, etc., can be converted to the carbonaceous state without significant reduction in weight or loss of carbon values. In order to convert such polyacetylenes to carbon and graphite fiber, it is necessary to produce a precursor fiber which can be carbonized. Direct heating of polyacetylenes to permit extrusion of polymer have been unsuccessful because the acetylenic bond can be activated at temperatures above 150°C rendering the polymer intractable. Efforts utilizing various organic solvents as plasticizers often have been unsuccessful, due to such factors as plasticizer incompatability, volatility, etc.

The present invention is based on the discovery that certain polyacetylene terpolymers, defined hereinafter, exhibit optimum plasticizing properties when employed with a variety of organic plasticizers, such as Arochlors, nitrobenzene to produce melt-extrudable blends. In addition, blends of polyacetylenes and certain substantially non-volatile organic plasticizers, such as 1,4-diphenyl-butadiyne can provide extrudate, films and composites allowing for optimum carbon yield due to the reactive and substantially non-volatile nature of the plasticizer.

There is provided by the present invention polyacetylene terpolymer having chemically combined units which consist essentially of A. a. 80 to 95 mole percent of diethynyl arylene units of the formula, (1) R(C ≡ C—, and b. 5 to 20 mole percent of diethynyl units of the formula, (2) 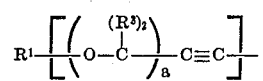

B. c. 0 to 5 percent by weight of diethynyl units of the formula, (3) —C ≡ C—, based on the weight of (A) and (B), where R is a phenylene radical having the valence bond in the meta position, or the para position, where the para phenylene radicals can be present at up to 12 mole percent, based on the total moles of meta and para phenylene radicals in the mixture, where the remaining valences of the phenylene radicals can be substituted with up to four monovalent radicals selected from hydrogen, alkyl radicals, having from one to eight carbon atoms, halogen radicals, and mixtures thereof, $R^1$ is a divalent organo radical selected from hydrocarbon radicals having from six to 40 carbon atoms,

and —RXR—, Y is selected from —OQ and

radicals, Q is selected from monovalent hydrocarbon radicals and halogenated monovalent hydrocarbon radicals, X is selected from

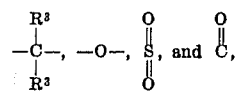

$R^2$ is a trivalent aryl radical, $R^3$ is selected from hydrogen and monovalent hydrocarbon radicals, such as methyl or phenyl, and $a$ has a value of 0 or 1.

Radicals included by R of formula (1) and (2) are, for example, arylene radicals, such as phenylene, xylylene, tolylene; halogenated derivatives of such arylene radicals, such as chlorophenylene, chlorotolylene, bromoxylylene, etc. Radicals included by $R^1$ are, for example, the aforementioned R radicals, alkylene radicals, such as hexamethylene, heptamethylene, octamethylene, nonamethylene, and radicals such as,

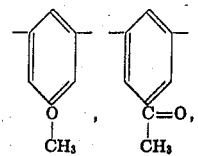

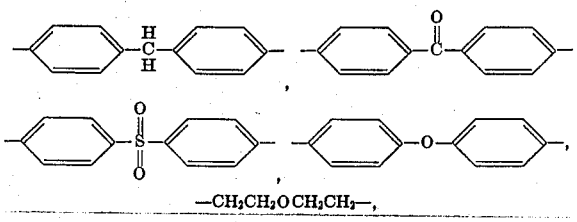

—CH₂CH₂OCH₂CH₂—,

Although the above-described polyacetylene terpolymers have been found to exhibit improved compatability with conventional organic plasticizers such as Arochlors, nitrobenzene, etc., as compared to, for example, polyacetylenes as shown by Hay U.S. Pat. No. 3,300,456, assigned to the same assignee as the present invention, such conventionl plasticizers have been found to volatilize excessively when employed as plasticizers for polyacetylenes. It has been found that substantially non-volatile plasticizers, for example, 1,4-diphenylbutadiyne which is described by A. S. Hay, Jour. Org. Chem., Vol. 25, P. 1275, (1960), can be employed in combination with polyacetylene including the polyacetylene terpolymers of the present invention to produce blends convertible to carbonaceous films and fibers, including graphite fiber showing a reduced overall loss in weight percent of carbon values based on the initial weight of the blend.

In addition to the above-described polyacetylene terpolymer, there is also provided by the present invention melt extrudable compositions in the form of blends of polyacetylenes, including the above terpolymers, and substantially non-volatile organic plasticizers. The melt-extrudable blends contain as essential ingredients by weight (A) from 25 to 75 percent of a substantially non-volatile aliphatically unsaturated organic plasticizer, and correspondingly, (B) from 75 to 25 percent by weight of a polyacetylene, where (A) is an aliphatically unsaturated organic compound having at least 90 percent by weight of chemically combined carbon, a boiling point of at least about 250°C, a melting point less than about 120°C, and a molecular weight in the range of from about 175 to 500.

Included by the non-volatile aliphatically unsaturated organic plasticizers are 1,4-diphenylbutadiyne, 1,4-diphenyl-cis-butenyne, 1,4-diphenyl-trans-buteyne, N-phenylmaleimide, 1,3-bis(phenylbutadiyne)benzene, etc.

The polyacetylenes which can be employed in the practice of the invention to produce the melt-extrudable blends are any organic polymer having chemically combined formula (3) radicals and can consist essentially of chemically combined carbon atoms and hydrogen atoms, or chemically combined carbon atoms, hydrogen atoms, and oxygen atoms, and in particular instances, in addition to the aforementioned atoms, chemically combined sulfur atoms, nitrogen atoms, and mixtures thereof.

Included by the polyacetylenes which can be utilized in the practice of the invention to produce melt-extrudable blends, are polymers containing in addition to formula (3) radicals, divalent radicals derived from diethynyl aromatic compounds, such as diethynyl benzene. Some of these polyacetylenes are shown by Hay U.S. Pat. No. 3,300,456, and include polymers having chemically combined formula (1) radicals. Preferably the melt-extrudable blends are made with polyacetylenes having chemically combined radicals of formula (1) and (2).

In addition to polyacetylenes having chemically combined formula (1) and (2) radicals are polyesters having acetyleneic bonds in the chain also can be employed as shown by Sladkov et al., Academy of Science, U.S.S.R., Bulletin Chemical Science, 1220–1222 (1963). Some of these polyacetylenes can be made by reacting an acetylenic dicarboxylic acid and a diol such as hexanediol.

As shown in copending application of Dwain M. White and Stanley Hobbs filed concurrently herewith, and assigned to the same assignee as the present invention, the polyacetylene terpolymers as defined above, are ideally suited for making melt extrudable blends in combination with various organic plasticizers because these terpolymers exhibit superior plasticizer compatability while providing minimal loss in carbon values when converted to graphite. In determining plasticizer compatability the terpolymer can be dissolved in the plasticizer, for example, orthodichlorobenzene to produce a solution having about 10 percent solids. It has been found that the terpolymer will remain in solution in particular instances at temperatures as low as 25°C, while other polyacetylenes, for example, copolymers included by Hay U.S. Pat. No. 3,300,456, will precipitate at substantially higher temperatures from the solvent.

The polyacetylene terpolymers of the present invention can be made by reacting ethynylarylene compounds to provide units of formula (1), such as meta-diethynylbenzene or mixtures of meta-diethynylbenzene with para-diethynylbenzene in combination with compounds which can provide units of formula (2), such as dipropargyl ethers, diethynyl alkylenes, and optionally with acetylene to provide units of formula (3), employing the oxidative coupling reaction disclosed in Hay U.S. Pat. No. 3,300,456, assigned to the same assignee as the present invention. There is employed in the oxidative coupling reaction, which will be shown more specifically in the examples set forth later, a basic cupric amine complex, and oxygen. A mixture, for example, of a dihydric phenol can be employed with a diethynyl arylene mixture consisting for example, of meta-diethynylbenzene and para-diethynylbenzene and employed in an oxygenated solution with an oxidative coupling catalyst such as cuprous chloride, N,N,N',N'-tetramethylethylenediamine with an appropriate organic solvent such as dichlorobenzene and pyridine. Recovery of the terpolymer can be achieved by the addition of the reaction mixture to methanol containing a trace of hydrochloric acid. The resulting terpolymer can thereafter be washed by conventional means with a solvent such as methanol and thereafter dried. When employing dipropargyl ether units in the reaction mixture, there is produced "ether terpolymers" while "alkylene terpolymers" can be made by using diethynyl alkylene compounds such as 1,6-diethynylhexane.

Among the ethynylarylene compounds which can be employed to introduce units of formula (1) into the terpolymer, there can be utilized diacetylene monomers of the arylene and haloarylene series, which can be derived by halogenation then dehydrohalogenation of the correspondingly divinyl arylenes, such as divinyl benzene, divinyl toluene, divinyl naphthalene, etc.

Included by the dipropargyl ethers which can be employed to introduce units of formula (2) into the terpolymer are reaction products of a propargyl halide, such as propargyl bromide, and dihydric phenols of the benzene, naphthalene, anthracene, etc., series, for example, hydroquinone, resorcinol, catechol, the isomeric dihydroxynaphthalenes, the isomeric dihydroxynaphthalenes, the isomeric dihydroxyanthracenes, etc., or they can be dihydroxy substituted biphenyls or diphenyl ethers, e.g., for example, the various isomeric bisphenols, for example, 2,2'-biphenol, 2,3'-biphenol, 2,4'-biphenol, 3,3'-biphenol, 3,4'-biphenol, 4,4'-biphenol, the isomeric bis(hydroxy-phenyl) ethers, for example, bis(2-hydroxyphenyl) ether, bis(3-hydroxyphenyl) ether, bis(4-hydroxyphenyl) ether, 2-(3-hydroxyphenoxy) phenol, 2-(4-hydroxyphenoxy) phenol, 3-(2-hydroxyphenoxy) phenol, 3-(4-hydroxyphenoxy) phenol, etc.

These dihydric phenols can also be the isomeric bis(hydroxyphenyl) sulfones, or the various isomeric dihydric phenols known as alkylene or alkylidienediphenols, for example, 4,4'-isopropylidenediphenol, 2,2'-isopropylidenephenol, 2,4'-isopropylidenediphenol, methylenediphenol, ethylenediphenol, ethylidenediphenol, 4,4'-(isopropylethylene) diphenol, etc.

Any of the above dihydric phenols can be substituted by halogen or a lower alkyl group, i.e., one to eight carbon atoms, typical examples which are chlorohydroquinone, bromohydroquinone, tetrachlorohydroquinone, methylhydroquinone, ethylhydroquinone, isopropylhydroquinone, butylhydroquinone, pentylhydroquinone, hexylhydroquinone, including cyclohexylhydroquinone, heptylhydroquinone, octylhydroquinone, etc., the corresponding halo and alkyl substituted catechols and resorcinols, etc., the halogen and lower alkyl substituted biphenols, the halogen and lower alkyl substituted bis-(hydroxyphenyl) ethers, the halogen and lower alkyl substituted bis(hydroxyphenyl) sulfones, the halogen and lower alkyl substituted alkylene and alkylidenebiphenols, etc.

In addition to the above dihydric phenols there also can be employed dihydric compounds containing a ketone group such as dihydroxybenzophenones, examples of which are, 2,2'-dihydroxybenzophenone, 2,3'-dihydroxybenzophenone, 2,3-dihydroxybenzophenone, 2,4'-dihydroxybenzophenone, 3,3'-dihydroxybenzophenone, 3,4'-dihydroxybenzophenone, 4,4'-dihydroxybenzophenone, 2,3'-dihydroxybenzophenone, 2,4'-dihydroxybenzophenone, 2,4-dihydroxybenzophenone, 3,4'-dihydroxybenzophenone, 3,4-dihydroxybenzophenone, the dihydroxybenzils, the dihydroxyphenyl naphthyl ketones, the phenyl dihydroxynaphthyl ketones, the hydroxyphenyl hydroxynaphthyl ketones, etc., are these same aryl ketones containing 1 or more halogens or lower alkyl substituents on the aryl group, examples of which are given above.

Likewise, these acetylenic polymers can be dipropargyl ethers of alkylcarbonyl substituted dihydric phenols. The alkylcarbonyl substituted dihydric phenols can be any dihydric phenol, numerous examples of which are given above, which also contains one or more alkyl-carbonyl (acyl) substitutents. For example, 2,4-dihydroxyacetophenone, 2,3-dihydroxyacetophenone, 2,5-dihydroxyacetophenone, 2,4-dihydroxypropiophenone, acetylbiphenols, diacetylbiphenols, etc.

Units of formula (2) in the form of diethylalkylene units can be introduced into the terpolymer to produce the alkylene terpolymer by the aforementioned oxidative coupling procedure of Hay, utilizing diethynyl arylenes as previously defined, in combination with diethynyl alkylenes such as 1,5-hexadiyne, 1,6-heptadiyne, 1,7-octadiyne, etc.

The melt extrudable blends of the present invention can be made by dispersing the non-volatile plasticizer with polyacetylene in any desirable manner known to the art. One procedure, for example, which can be employed involves dissolving of the non-volatile plasticizer in a suitable volatile organic solvent, such as methylene chloride and slurrying the polyacetylene with the solution. The volatile solvent thereafter can be removed by conventional means such as by stripping. A proportion of from 0.33 to 3 parts of the non-volatile plasticizer per part of polyacetylene will provide for effective results. In particular cases the polyacetylene which has been thoroughly contacted with the non-volatile plasticizer can be heated to form a uniform solution and cast to a film. In other instances, a melt of the non-volatile plasticizer and the polyacetylene can be extruded to pellets. The pellets can be employed as an extrudable source of material for making precursors of graphite fiber by conventional melt extrusion techniques.

In order that those skilled in the art may be better able to practice the invention the following examples are given by way of illustration, and not by way of limitation. All parts are by weight.

EXAMPLE 1

A terpolymer was made by employing dipropargyl ether of 2,2-bis(4-hydroxyphenyl) propane, (Bisphenol-A), meta-diethynylbenzene and para-diethynylbenzene utilizing an oxidative coupling catalyst produced with cuprous chloride, N,N,N',N'-tetramethylethylenediamine, and a solvent system of pyridine and dichlorobenzene.

There was added a solution in about 25 parts of dichlorobenzene of 0.5 parts of the dipropargyl ether of bisphenol-A, 4.1 parts of meta-diethynylbenzene, and 0.4 parts of para-diethynylbenzene to a mixture of 0.15 parts of cuprous chloride, about 0.18 parts of N,N,N',N'-tetramethylethylenediamine dissolved in an oxygenated solution of about 1.7 parts of pyridine and 75 parts of ortho-dichlorobenzene at 60°C. The temperature of the mixture rose to 88.5°C while it was stirred after about 2 minutes. The mixture also became too thick to stir. After 10 minutes the mixture was allowed to cool to room temperature, and added to excess methanol containing a trace of hydrochloric acid. There was obtained a quantitative yield of product having an intrinsic viscosity in ortho-dichlorobenzene at 120°C of 0.77 dl/g.

Following the same procedure above, there was employed in place of the dipropargyl ether of bisphenol-A, another dipropargyl ether of a dihydric phenol, specifically 4,4'-dihydroxy-3,3',5,5'-tetra-t-butyl-biphenyl employing the latter dipropargyl ether in the same weight percent as the dipropargyl ether of bisphenol-A in the reaction mixture. Additional terpolymers were made employing the same ingredients which were varied over a wide weight percent range in the respective reaction mixture to determine the optimum degree of compatability of the terpolymer in ortho-dichlorobenzene to produce a solution of the terpolymer having 7 percent by weight solids. It was found that optimum plasticizer compatability was achieved with the terpolymer when there was about 10 percent by weight of dipropargyl dihydric phenol ether units, about 8 percent by weight of paradiethynylbenzene units, and 82 percent by weight of meta-diethynylbenzene units, which is equivalent to 4 percent, 9 mole percent, and 87 mole percent, of the aforementioned units, respectively. The results achieved with terpolymers contained either the dipropargyl ether of bisphenols or the dipropargyl ether of the tetra-t-butylbiphenol dihydric phenol were substantially equivalent when employed at the optimum weight percent. It also was found that these latter terpolymers resulted in less than 7 percent loss by weight of carbon values based on the theoretical weight percent of carbon, when the terpolymers were subsequently graphitized in fibrous form.

Several of the above described terpolymers are respectively blended with ortho-dichlorobenzene utilizing 2 parts of plasticizer, per part of terpolymers. The blends are extruded to produce 2 mil diameter extrudate. The extrudate is heated slowly to a temperature of 300°C. The resulting heat treated fiber is then stress graphitized at from 4,000 to 14,000 psi at temperatures up to 3,000°C in an argon atomosphere. High strength graphite is obtained having a tensile of $330 \times 10^3$ psi.

EXAMPLE 2

A solution of 0.5 parts of 1,7-octadiyne, 4.2 parts of meta-diethynylbenzene and 0.3 parts of para-diethynylbenzene in 25 parts of ortho-dichlorobenzene was added to a solution of 0.15 parts of cuprous chloride, about 0.23 parts of N,N,N',N'-tetramethyl-1,2-ethylenediamine and about 1.7 parts of pyridine, in about 75 parts of ortho-dichlorobenzene, which was being oxygenated and stirred at 62 ½°C. The temperature of the mixture rose to about 88°C within 2 minutes and then gradually dropped. The mixture was stirred for 60 minutes and then poured into about 500 parts of methanol containing a trace of hydrochloric acid. The product which precipitated was collected on a filter and washed with additional methanol and dried at 25°C. There was obtained a 99 percent yield of product having an intrinsic viscosity of 0.50 dl/g at 120°C. Based on method of preparation the product was an ethylene terpolymer composed essentially of 12 mole percent of octadiynyl units, 82 mole percent of meta-diethynylbenzene units, and 6 mole percent of para-diethynylbenzene units.

Several additional alkylene terpolymers were made following the same procedure to determine the optimum mole percent ranges of ethynyl units for plasticizer compatability, as determined in ortho-dichlorobenzene. It was found that the optimum concentration which produced a solution in ortho-dichlorobenzene and 10 percent solids at temperatures as low as 33°C, was a terpolymer having 15 mole percent of alkylene diethynyl units, 76 mole percent of meta-diethynylbenzene units, and 8 mole percent of para-diethynylbenzene units.

A weight loss of less than 5 percent was experienced when the terpolymers were graphitized as described in Example 2. There was obtained high strength graphite fiber useful for making composites with epoxy resins.

EXAMPLE 3

There was added a solution of 4.23 parts of meta-diethynylbenzene, .27 part of para-diethynylbenzene, 0.50 part of the dipropargyl ether of bisphenol-A in orthodichlorobenzene to an oxygenated mixture of 0.15 parts of cuprous chloride, 0.17 part of tetramethylethylenediamine, about 1.7 part of puridine, and approximately 60 parts of ortho-dichlorobenzene. Oxygenation of the mixture was achieved by bubbling oxygen into the solvent at a rate of about 0.5 cubic feet per hour, per mole of ethnyl compound. There was then bubbled into the mixture 0.28 parts of acetylene over a 2 minute period. The reaction temperature rose steadily from an initial bath temperature of about 61°C to about 80.5°C, and then gradually dropped. External heating was removed after about 6 minutes, after which time the oxygenation of the mixture was discontinued. The product began to precipitate upon cooling. The mixture was added to excess methanol acidified with hydrochloric acid to effect the precipitation of product. Recovery of the product was achieved by a standard extraction technique, followed by washing with methanol. Based on method of preparation of product was a polyacetylene having about 4 mole percent of chemically combined dipropargyl bisphenol-A ether units, 96 mole percent of para-diethynylbenzene units, and meta-diethynylbenzene units, and about 5 percent by weight of acetylene units based on the weight of polyacetylene. The product had an intrinsic viscosity in dichlorobenzene at 120°C of 1.12 dl/g and did not precipitate from a 1 percent solution in orthodichlorobenzene until cooled to 30°C.

EXAMPLE 4

Equal parts of 1,4-diphenylbutadiyne and the terpolymer of Example 1 containing the dipropargyl bisphenol-A ether units were mixed thoroughly in a mortar and pestle. The powder was heated to 125°C in an extruder to form a melt. The melt was then extruded, and the extrudate was collected on a spool. A 6 inch sample of the extrudate, having an average diameter of about 1 mil was carbonized. It was found that the extrudate experienced a weight loss of less than 18% by weight when heated rapidly to 900°C. Carbon fiber was obtained, useful as a reinforcing fiber for making high strength composites.

EXAMPLE 5

Equal parts of 1,3-bis(phenylbutadiynyl)-benzene and the terpolymer of Example 1 were thoroughly mixed with a mortar and pestle.

A melt of the blend formed at about 100°C and it was poured onto an aluminum substrate. A film formed upon cooling. The film was heated at 150°C for 30 minutes. The heat treated product was carbonized at temperatures to 900°C under nitrogen and experienced a weight loss of less than 7 percent based on the initial weight of the blend. There was obtained a porous carbonaceous film exhibiting conductivity when tested with a volt-ohmeter. It was useful as a positive electrode in a conventional galvanic cell or air cell.

Additional blends were also made following the same procedure from the terpolymer of Example 1, and cis-1,4-diphenylbutenyne, trans-1,4-diphenylbutenyne and diphenyl acetylene. Films were made with each of the respective blends, which were carbonized at temperatures up to 900°C under nitrogen. The various films were found to have substantially similar properties, as described above.

EXAMPLE 6

A slurry of 10 parts of one-half inch glass fibers, 36 parts, 1,4-diphenylbutadiyne dissolved in 200 parts benzene and 54 parts of the terpolymer described in Example 2, is evaporated to dryness in a rotary evaporator. A portion of the dry blend is placed in a cylindrical mold which is placed in a press and heated to 160°C. After 30 minutes, the mold temperature reached 150°C. A pressure of 3,000 psi is applied. The mold is heated to 280°C for 20 minutes. A tough, coherent, crack-free part is obtained.

Although the above examples show only a few of the very many terpolymers included within the scope of the present invention, it should be understood that the present invention is directed to a much broader class of terpolymers having chemically combined units of formulas (1) and (2), and optionally (3). In addition, the present invention is directed to a much broader class of extrudable blends of polyacetylene and substantially non-volatile plasticizers.

What we claim as new and desire to secure by Letters Patent of the United States:

1. A melt extrudable blend containing as essential ingredients
    A. from 25 to 75 per cent by weight of a substantially non-volatile aliphatically unsaturated organic plasticizer selected from the class consisting of 1,4-diphenylbutadiyne, 1,4-diphenyl-cis-butenyne, 1,4-diphenyl-trans-butenyne, N-phenylmaleimide, 1,3-bis(phenylbutadiyne)benzene and mixtures thereof, and correspondingly
    B. 75 to 25 percent by weight of a polyacetylene consisting essentially of
        a. 80 to 95 mole per cent of diethynyl phenylene units selected from meta-diethynyl phenylene units and a mixture of metadiethynyl phenylene units and up to 12 mole per cent of such mixture of paradiethynyl phenylene units
        b. 5 to 20 mole per cent of diethynyl units selected from the class consisting of dihydric phenol-dipropargyl ether units, diethynyl alkane units and mixtures thereof
        c. 0 to 5 per cent by weight of acetylene units based on the weight of (a) and (b).

2. A melt-extrudable blend in accordance with claim 1, where (A) is a 1,4-diphenylbutadiyne.

3. A melt-extrudable blend in accordance with claim 1, where (B) is a terpolymer consisting essentially of chemically combined dihydricphenol dipropargyl ether units, para-diethynylbenzene units, and meta-diethynylbenzene units.

4. A melt-extrudable blend in accordance with claim 3, where the dihydricphenol dipropargyl ether units are present at about 4 mole percent, meta-diethynyl units are present at about 87 mole percent, and the para-diethynylbenzene units are present at about 9 mole percent.

5. A melt-extrudable blend in accordance with claim 1, where (B) is a terpolymer consisting essentially of diethynyl alkylene units, para-diethynylbenzene units, and meta-diethynylbenzene units.

6. A melt-extrudable blend in accordance with claim 5, where the diethynyl alkylene units are present at about 12 mole percent, the para-diethynylbenzene units are present at about 6 mole percent and the meta-diethynylbenzene units are present at about 82 mole percent.

7. A melt-extrudable blend in accordance with claim 1, where (A) is a 1,4-diphenylbutenyne.

* * * * *